Patented July 16, 1940

2,207,847

UNITED STATES PATENT OFFICE 2,207,847

SYNTHETIC RESINS

László Auer, Mansfield, Mass.

No Drawing. Application August 17, 1937,
Serial No. 159,585

5 Claims. (Cl. 260—20)

This invention or discovery relates to synthetic resins; and it comprises a synthetic resin composition useful as a varnish base in making oil varnishes of the type containing a rosin modified maleic anhydrid type resin, together with a modicum of an oil-soluble phenolic resin and a very small amount of a polar compound like para-toluene sulphonic chloride; all as more fully hereinafter set forth and as claimed.

Synthetic resins of various types are in large use as varnish bases. Most of the phenolaldehyde resins are not soluble in drying oils, but there are types which are; these resins being derived from phenols carrying side chains, the diphenyl phenols, the butylated phenols, etc. These resins, which are commercially known as "pure phenolic oil-soluble resins," are valuable varnish bases, but they are open to a number of objections. One is that they produce varnishes which are more or less dark or subject to after-yellowing with production of darkening varnish films on drying on surfaces.

Among other synthetic resins valuable as a varnish base in oil varnishes are the rosin-modified maleic anhydrid type of alkyd resins. These are made in various ways with various mixtures, but in a general way they are made by melting together maleic anhydrid, rosin and glycerine, heating being to a temperature up to 540° F. Volatiles including excess glycerine may be taken off by using a vacuum after the temperature goes above 400° F. Similar "rosin-modified" alkyds may be made using phthalic anhydrid in lieu of the maleic anhydrid. These alkyd resins give light-colored, transparent varnishes when cooked with linseed oil or tung oil, either or both. Light-colored transparent varnishes so made are largely used in baking "over print varnishes"; that is, in varnishing printed or decorated matter. They are also used in enamels, both of the baked-on and of the air-dried types. They do not after-yellow by the action of heat or light or darkness.

While this type of alkyd resin has many virtues and is in extensive use, there are certain drawbacks. One is that oil varnishes containing them dry more slowly than varnishes made with phenolic resins. And where the drying oil is tung oil, the varnishes containing these resins are apt to gascheck badly.

An object achieved in the present invention is to improve this type of resin. This is done by incorporating certain polar compounds in small amount. The best I have found for this purpose is para-toluene sulphonic chloride and in amount less than 1 per cent of the whole resin, there is a marked improvement in quality. For one thing there is an improvement in gas-proofing where tung oil is the oil vehicle. Quite generally, an amount between 0.1 and 0.2 per cent of added para-toluene sulphonic chloride incorporated into the resin is sufficient to effect a marked improvement not only in tung oil varnishes, but also in varnishes made with linseed oil, perilla oil, and other well known drying oils. Their aging qualities are better and they are chemically more resistant. The same benefits are obtained with tung oil. The addition, however, slows down the speed of drying to some extent.

As stated, oil varnishes containing rosin-modified maleic anhydrid resins, though excellent in many ways are not quick drying, and the addition of a polar compound of the type stated, while giving improvement in many respects, is disadvantageous in this particular.

To counteract these influences and to accomplish some other desirable results, I add a small proportion, less than 10 per cent of the whole composition, of a pure phenolic resin of the oil-soluble type described. This accelerates the drying velocity and in the small amount does not injuriously affect the color or lead to after-yellowing. The good color retention and other advantageous properties of the rosin modified alkyd resins are still retained.

As particularly suitable for this addititon I find resins made with formaldehyde reacting on diphenyl phenols such as para-hydroxy diphenyl, on para-tertiary butyl phenol and para-tertiary amyl phenol. While commercial formaldehyde is generally used in making these resins, hexamethylene tetramin, paraformaldehyde, acetaldehyde and even furfuraldehyde are available. Phenols of high molecular weight, higher than that of the cresols, such as xylenols are also used in making these pure phenol resins. Oil soluble resins of the pure phenolic type suitable for the present purposes can be made without formaldehyde by interaction of phenol or cresol and oxyterpenes, of the class of terpineol, menthol and menthone, in the presence of an acid catalyst, which may be sulfuric acid or phosphoric acid. Pine oil fractions containing terpineol are a suitable source material. These resins give good products when used in the present invention.

An unexpected result of the two additions is a considerable improvement as regards resistance to alkali and to mechanical marring. Both are important where the composition is used, as it can be, in forming the surfacing coat of floor coverings. These floor coverings often consist of an asphalt impregnated felt base carrying a layer of alkyd varnish, usually in admixture with fillers. Ordinary alkyd resins of the rosin modified type give excellent results in this relation but they are not altogether resistant to energetic scouring and highly alkaline soaps. The resin of the present invention in an oil varnish gives a coating with a surface much more resistant to scouring detergents. And it is not nearly so much subject to scratching and marring by heel nails, etc., being more resistant in this respect than alkyd varnish compositions of ordinary types.

In a typical embodiment of the present invention producing an improved alkyd resin oil varnish free of after-yellowing and resistant to soap and scouring, an alkyd resin is made by heating together 3500 parts of commercial N. wood rosin, 300 parts maleic anhydrid and 1000 parts of glycerine; heating being to 540° F. The temperature is held at this point for five hours, a vacuum being employed after the temperature reaches 500° F. As so far described the rosin modified maleic anhydrid alkyd is of a type known in the art. With oil it gives varnishes of high quality but they are, relatively, slow drying and in the case of tung oil varnishes they exhibit gas checking. To this resin, however, as it cools down is added 200 parts by weight of an oil-soluble pure phenolic resin of the type described, addition being when the temperature reaches 482° F. or thereabouts. The batch is held at this temperature for an hour. There is then added, without cooling, 8 parts by weight of para-toluene sulphochloride. The temperature is held constant for about thirty minutes, after which the batch is poured and cooled. The novel resinous composition may be cooked into a China-wood oil varnish composition giving improved gas-checking properties and a swifter drying rate. It may likewise be incorporated into a linseed oil composition giving a varnish drying faster than a similar varnish made with an ordinary rosin modified alkyd, and the alkali resistance of the dried varnish is much better; the varnish coating is more resistant to scouring detergents.

The order of addition may be changed, the polar compound being added prior to or simultaneously with admixture of the oil soluble phenolic resin. However, there is some advantage in adding the polar compound last.

In making the alkyd resin there is some loss in weight due to water and excess glycerine distilled over. But with the quantities mentioned, 3500 rosin, 300 maleic anhydrid and 1000 ordinary glycerine, the batch will weigh about 4000. The proportions mentioned of oil-soluble pure phenolic resin and a polar compound are based on a 4000 pound batch.

In making oil varnishes with the new resin as a base, there may be added the usual driers such as cobalt linoleates. The amount of drying oil used relative to the alkyd varnish, of course, depends on whether a short oil varnish or a long oil varnish is required. Naturally, the betterment in quality in the varnish shows up better in a short oil varnish than in a long oil varnish. But there is substantial betterment in all cases.

In a way, the new resin represents a compromise. The addition of a polar compound improves the gas proofness, which is important with tung oil varnishes and it gives a general improvement with other varnishes. But it still further diminishes the drying velocity. The addition of a small amount of pure phenolic resin improves the drying velocity, does not influence the gas proofing qualities and does not darken the color. By using both the polar compound and the pure phenolic resin in the quantities mentioned, the optimum combination of the qualities is secured. However, more than 10 per cent of pure phenolic resin is sometimes used. There is no great advantage in using more than 0.1 to 0.2 per cent of the polar compounds but more can be employed up to, say, 5 per cent.

As stated, rosin modified phthalic anhydrid resin can also be bettered by use of the present invention. The manufacturing method given may be used with phthalic anhydrid using, however, 500 parts in lieu of the 300 parts of maleic anhydrid stated.

Floor coverings are made in various ways. Sometimes an asphalt impregnated web is simply coated with a layer of varnish. Sometimes the base is a plastic mass containing asphaltic material and felt fiber; this plastic mass being sheeted out by calendering and afterwards coated with various paints or enamels including the described alkyd resin composition. Sometimes there are several coats of paint and varnish of different character. In such event the resin of the present invention is used in the top coat. It is advantageous to use it in intermediate layers.

In the present invention as described, a minute amount, 0.1 or 0.2 per cent of para-toluene sulphonic chloride is added to a rosin modified maleic anhydrid alkyd resin. This small amount suffices to lessen gas-checking where the resin is used with tung oil and though it somewhat retards drying, the retardation is not great and can be compensated for, with certain other advantages gained, by a somewhat larger addition of "pure phenolic resin." The quantity of the para-toluene sulphonic chloride can be increased somewhat over the stated amount of 0.1 and 0.2 per cent, up to, say, 5 per cent, but in a general way there is little advantage in using high amounts of polar compounds. As noted there is a retarding effect; the polar compounds slow down the velocity of drying.

Para-toluene sulphonic chloride is typical of a number of polar compounds that may be used with advantage in the present invention. In another and prior Patent No. 1,980,367, I have described and claimed ways of changing the consistency of natural resin by rather large additions of polar agents including para-toluene sulphonic acid. About 5 per cent or so of a number of these polar compounds when heated with rosin, etc., convert it into oily products of new utility. This liquefying effect does not occur with synthetic resins of the present invention; they are not converted into oily bodies. Any of the polar agents mentioned in said prior patent can be here used in the new proportions, say less than 0.5 per cent, and for the new purpose. Among other polar compounds mentioned in the patent and useful are:

2-phenylamine-3-naphthol-6 - sulphonic acid, beta - naphthylamine - 3:6:8 - trisulphonic acid, beta - naphthol - 3:6:8 - trisulphonic acid, beta-naphthol-1:5-disulphonic acid, naphthalene-2:6-disulphonic acid, naphthalene-1-sulphonyl chloride, m-xylidine sulphonic acid, benzene sulphonic acid, p-toluene sulphonic acid, p-toluene sulphonyl chloride, 5-sulpho salicylic acid, p-toluidine-m-sulphonic acid, benzene sulphonyl chloride, and 2:5-dichlor benzene sulphonic acid.

These polar bodies may be graphically represented as $Y-SO_n-X$ wherein Y represents an organic nucleus, hydrogen or chlorine, X represents hydrogen or chlorine and $n$ represents 1, 2, 3 or 4.

The utility of the minor addition of a polar compound seems to reside in its polarity. And while substances coming within the above classification are useful, there are some other polar compounds including sulphur chloride, $S_2Cl_2$ in minute amounts giving good results. Among other inorganic polar compounds giving good results in the present invention, may be listed chloro sulphonic acid, sulfuric acid sulfuryl chloride and thionyl chloride, all of which are more active than sulfur chloride and may be used in less amounts. Arylated and alkylated derivates of these bodies are also useful; bodies of the general composition $R.SO_nX$ wherein R represents an aryl nucleus, X represents hydrogen or chlorine and $n$ represents 2 or 3.

What I claim is:

1. In the manufacture of quick-drying varnish bases giving coatings resisting alkali, scouring and alkaline detergents, the process which comprises heating a rosin-modified maleic anhydrid resin, incorporating into the hot resin paratoluene sulfonic chloride and adding a pure phenolic oil soluble resin in quantity less than that of the rosin-modified maleic anhydrid and then incorporating in a drying oil the resin mixture so obtained.

2. As a new quick-drying varnish base, a mixture of a major amount of a rosin modified alkyd resin containing a small amount of a polar compound and a minor amount of pure phenolic oil-soluble resin, admixed with a drying oil, said polar compound having the general formula $Y-SO_n-X$ wherein Y represents a substituent of the group consisting of an organic nucleus, hydrogen or chlorine, X represents a substituent of the group consisting of hydrogen or chlorine and $n$ represents 1, 2, 3 or 4.

3. The varnish base of claim 2 wherein the rosin modified alkyd resin is a rosin modified maleic anhydrid resin.

4. The varnish base of claim 2 wherein the polar compound is present in an amount not greater than 0.5 per cent of the mixture.

5. The varnish base of claim 2 wherein the said polar compound is paratoluene sulfonyl chloride.

LÁSZLÓ AUER.